United States Patent [19]

Corsmeier et al.

[11] Patent Number: 5,054,997
[45] Date of Patent: Oct. 8, 1991

[54] BLADE TIP CLEARANCE CONTROL APPARATUS USING BELLCRANK MECHANISM

[75] Inventors: Robert J. Corsmeier; Joseph Petsche, both of Cincinnati, Ohio

[73] Assignee: General Electric Company, Cincinnati, Ohio

[21] Appl. No.: 440,633

[22] Filed: Nov. 22, 1989

[51] Int. Cl.[5] .............................................. F01D 11/08
[52] U.S. Cl. .................................. 415/173.2; 415/126
[58] Field of Search ............... 415/173.2, 173.6, 174.1, 415/173.1, 126, 127

[56] References Cited

U.S. PATENT DOCUMENTS

| 3,039,737 | 6/1962 | Kothoff, Jr. ........................ 415/17 |
| 3,062,497 | 11/1962 | Howes et al. ....................... 415/126 |
| 3,085,398 | 4/1963 | Ingleson ............................. 60/39.32 |
| 3,520,635 | 7/1970 | Killmann et al. .................... 415/138 |
| 3,623,736 | 11/1971 | Petrie et al. ........................ 277/27 |
| 3,966,354 | 12/1974 | Patterson .......................... 415/116 |
| 4,005,946 | 6/1975 | Brown et al. ....................... 415/136 |
| 4,050,843 | 9/1977 | Needham et al. .................... 415/116 |
| 4,230,436 | 10/1980 | Dauson .................................. 415/1 |
| 4,264,274 | 4/1981 | Benedict ........................... 415/199.5 |
| 4,330,234 | 5/1982 | Colley .............................. 415/173.2 |
| 4,332,523 | 6/1982 | Smith ................................ 415/126 |
| 4,343,592 | 8/1982 | May .................................. 415/173.2 |
| 4,384,819 | 5/1983 | Baker ................................ 415/14 |
| 4,419,044 | 12/1983 | Barry et al. ........................ 415/117 |
| 4,632,635 | 12/1986 | Thoman et al. ...................... 415/14 |
| 4,657,479 | 4/1987 | Brown et al. ....................... 415/138 |
| 4,683,716 | 8/1987 | Wright et al. ...................... 60/226.1 |
| 4,714,404 | 12/1987 | Lardellier ......................... 415/127 |
| 4,773,817 | 9/1988 | Stangalini ........................... 415/48 |

FOREIGN PATENT DOCUMENTS

| 869908 | 6/1961 | United Kingdom ............. 415/173.2 |
| 2024336 | 1/1980 | United Kingdom ............. 415/173.2 |
| 2068470 | 8/1981 | United Kingdom . |
| 2108591 | 5/1983 | United Kingdom ................ 415/127 |
| 2199664 | 7/1988 | United Kingdom . |

OTHER PUBLICATIONS

Technical Report Afapl-TK-79-2087, entitled "Thermal Response Turbine Shroud Study" by E. J. Kawecki of Pratt & Whitney; Jul. 1979.

*Primary Examiner*—John T. Kwon
*Attorney, Agent, or Firm*—Jerome C. Squillaro

[57] ABSTRACT

A clearance control apparatus has a positioning mechanism for controlling clearance between rotor blade tips and a shroud segment of a gas turbine engine casing. The positioning mechanism is supported by the casing, coupled to the shroud segment, and actuatable for moving the shroud segment toward and away from the rotor blade tips to reach a position at which a desired clearance is established. The mechanism includes a shaft and a bellcrank actuating assembly. The shaft is mounted through a passage defined by a mounting structure on the casing for radial movement along a longitudinal axis of the shaft toward and away from the rotor axis and is coupled at its inner end to the shroud segment. The bellcrank actuating assembly is coupled to an outer end of the shaft and mounted to the casing adjacent the shaft for pivotal movement about an axis spaced from and extending transverse to the longitudinal axis of the shaft. The pivotal movement of the bellcrank actuating assembly produces radial movement of the shaft and shroud segment therewith toward and away from the rotor blade tips.

22 Claims, 5 Drawing Sheets

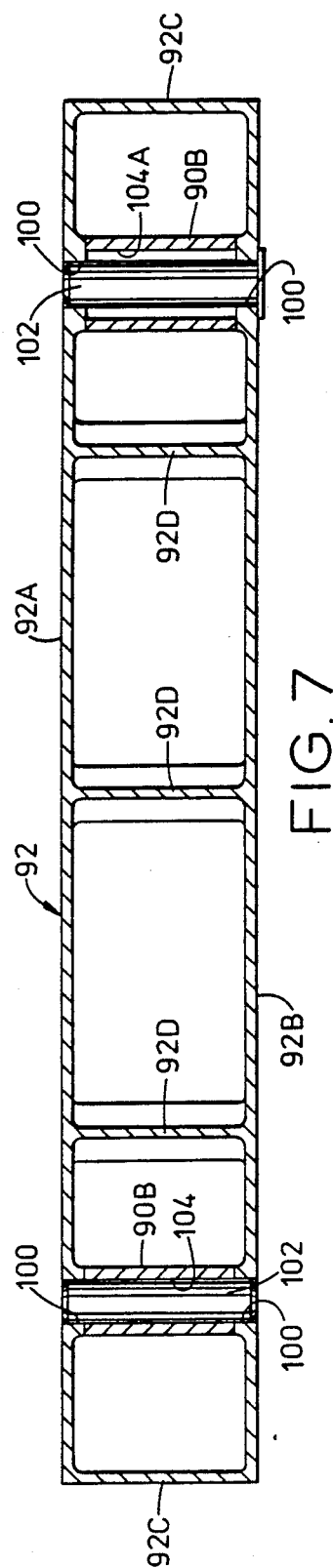
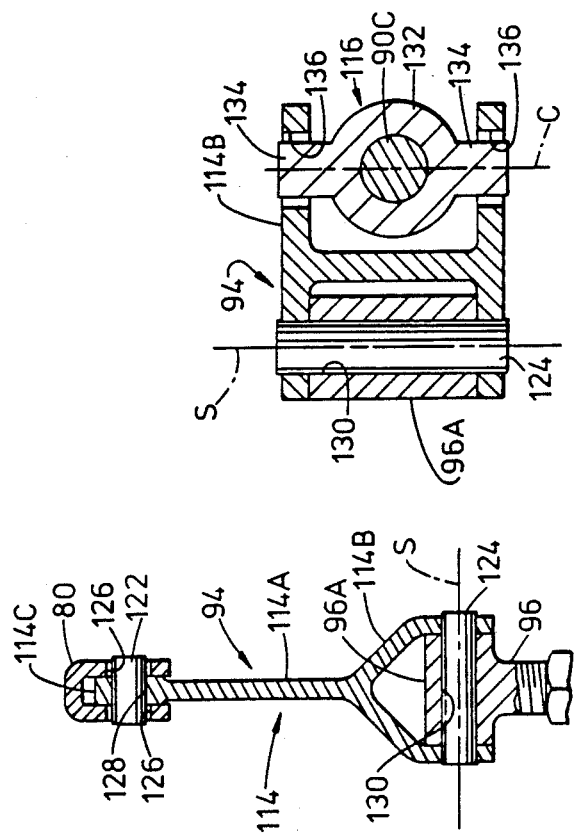
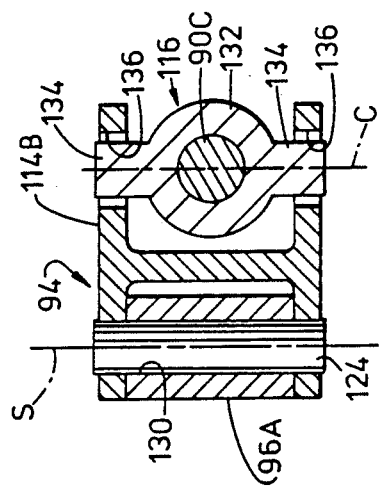

BLADE TIP CLEARANCE CONTROL APPARATUS USING BELLCRANK MECHANISM

RIGHTS OF THE GOVERNMENT

The invention herein described was made in the performance of work under a NASA contract and is subject to the provisions of Section 305 of the National Aeronautics and Space Act of 1958, Public Law 85-568 (72 Stat. 435; 42 USC 2457).

CROSS-REFERENCE TO RELATED APPLICATIONS

Reference is hereby made to the following copending U.S. patent applications dealing with related subject matter and assigned to the assignee of the present invention:

1. "Blade Tip Clearance Control Apparatus For A Gas Turbine Engine" by John J. Ciokajlo, assigned U.S. Ser. No. 405,369 and filed 9-8-89.
2. "Mechanical Blade Tip Clearance Control Apparatus For A Gas Turbine Engine" by John J. Ciokajlo et al, assigned U.S. Ser. No. 404,923 and filed 9-8-89.
3. "Blade Tip Clearance Control Apparatus Using Shroud Segment Position Modulation" by Robert J. Corsmeir et al, assigned U.S. Ser. No. 480,198 and filed Feb. 12, 1990.
4. "Blade Tip Clearance Control Apparatus Using Cam-Actuated Shroud Segment Positioning Mechanism" by Robert J. Corsmeir et al, assigned U.S. Ser. No. 482,139 and filed Feb. 20, 1990.

BACKGROUND OF THE INVENTION

1. Field of the Invention

The present invention relates generally to gas turbine engines and, more particularly, to an apparatus for controlling clearance between adjacent rotating and non-rotating components of a gas turbine engine.

2. Description of the Prior Art

The efficiency of a gas turbine engine is dependent upon many factors, one of which is the radial clearance between adjacent rotating and non-rotating components, such as, the rotor blade tips and the casing shroud surrounding the outer tips of the rotor blades. If the clearance is too great, an unacceptable degree of gas leakage will occur with a resultant loss in efficiency. If the clearance is too little, there is a risk that under certain conditions contact will occur between the components.

The potential for contact occurring is particularly acute when the engine rotational speed is changing, either increasing or decreasing, since temperature differentials across the engine frequently result in the rotating and non-rotating components radially expanding and contracting at different rates. For instance, upon engine accelerations, thermal growth of the rotor typically lags behind that of the casing. During steady-state operation, the growth of the casing ordinarily matches more closely that of the rotor. Upon engine decelerations, the casing contracts more rapidly than the rotor.

Control mechanisms, usually mechanically or thermally actuated, have been proposed in the prior art to maintain blade tip clearance substantially constant. However, none are believed to represent the optimum design for controlling clearance. Consequently, a need still remains for an improved mechanism for clearance control that will permit maintenance of minimum rotor blade tip-shroud clearance throughout the operating range of the engine and thereby improve engine performance and reduce fuel consumption.

SUMMARY OF THE INVENTION

The present invention provides a blade tip clearance control apparatus which satisfies the aforementioned needs and achieves the foregoing objectives. Further, the blade tip clearance control apparatus employs a bellcrank-actuated shroud segment positioning mechanism which achieves these objectives without a large increase in weight. The components of the positioning mechanism are located outside the casing for easy adjustment and maintenance and are few in number and easy to manufacture and assemble. Further, the components of the positioning mechanism provide a leverage arrangement having a mechanical advantage which makes in and out radial movement of the shroud segments relatively insensitive to small unintended circumferential movements of the unison ring.

The clearance control apparatus of the present invention is provided in a gas turbine engine which includes a rotatable rotor having a central axis and a row of blades with tips and a stationary casing, with a shroud, disposed in concentric relation with the rotor. The clearance control apparatus, operable for controlling the clearance between the rotor blade tips and the casing shroud, comprises: (a) a shroud segment defining a circumferential portion of the casing shroud and being separate from and spaced radially inwardly of the casing; (b) at least one mounting structure on the stationary casing spaced radially outwardly from the shroud segment and defining a passage extending between exterior and interior sides of the casing; and (c) a shroud segment positioning mechanism supported by the casing, coupled to the shroud segment, and being actuatable for moving the shroud segment toward and away from the rotor blade tips to reach a position relative thereto at which a desired clearance is established between the shroud segment and rotor blade tips.

More particularly, the positioning mechanism includes a shroud segment support member and a bellcrank actuating assembly. The support member is mounted through the passage defined by the mounting structure for radial movement relative to the casing and toward and away from the rotor axis. The support member has a longitudinal axis and opposite inner and outer ends with the shroud segment being coupled to the inner end of the support member at the interior side of the casing. The actuating assembly is coupled to the outer end of the support member and located at the exterior side of the casing.

Also, the positioning mechanism includes a support structure on the stationary casing which mounts the actuating assembly adjacent to the mounting structure for pivotal movement about an axis spaced from and extending transverse to the longitudinal axis of the support member. Pivotal movement of the actuating assembly about the transverse axis produces radial movement of the support member and the shroud segment therewith relative to the casing and along the longitudinal axis toward and away from the rotor blade tips.

Further, the positioning mechanism includes a shroud holder connected to the inner end of the support member. The shroud holder has axially-spaced circumferentially-extending grooves for slidably receiving and holding the shroud segment at spaced longitudinal edge portions thereof.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 7 is a circumferential sectional view of a shroud holder of the apparatus as taken along line 7—7 of FIG. 6.

FIG. 8 is a sectional view of a bellcrank of the apparatus as taken along line 8—8 of FIG. 6.

FIG. 9 is a sectional view of a cradle of the apparatus as seen along line 9—9 of FIG. 6.

DETAILED DESCRIPTION OF THE INVENTION

Figure 1:
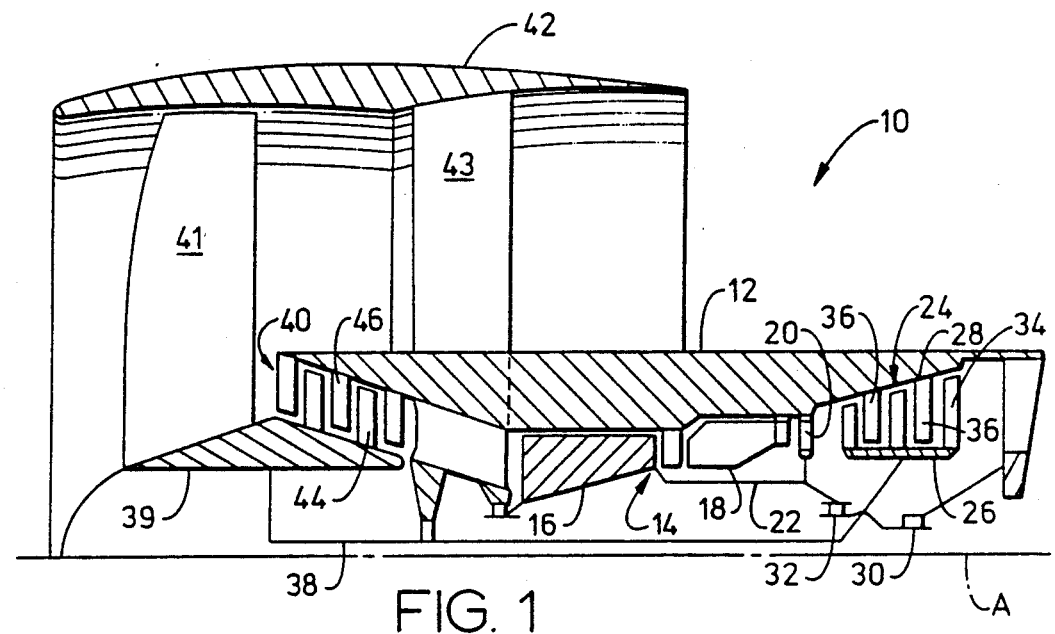
FIG. 1 is a schematic view of a gas turbine engine.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is illustrated a gas turbine engine, generally designated 10, to which the present invention can be applied. The engine 10 has a longitudinal center line or axis A and an annular casing 12 disposed coaxially and concentrically about the axis A. The engine 10 includes a core gas generator engine 14 which is composed of a compressor 16, a combustor 18, and a high pressure turbine 20, either single or multiple stage, all arranged coaxially about the longitudinal axis or center line A of the engine 10 in a serial, axial flow relationship. An annular drive shaft 22 fixedly interconnects the compressor 16 and high pressure turbine 20.

The core engine 14 is effective for generating combustion gases. Pressurized air from the compressor 16 is mixed with fuel in the combustor 18 and ignited, thereby generating combustion gases. Some work is extracted from these gases by the high pressure turbine 20 which drives the compressor 16. The remainder of the combustion gases are discharged from the core engine 14 into a low pressure power turbine 24.

The low pressure turbine 24 includes an annular drum rotor 26 and a stator 28. The rotor 26 is rotatably mounted by suitable bearings 30 and includes a plurality of turbine blade rows 34 extending radially outwardly therefrom and axially spaced. The stator 28 is disposed radially outwardly of the rotor 26 and has a plurality of stator vane rows 36 fixedly attached to and extending radially inwardly from the stationary casing 12. The stator vane rows 36 are axially spaced so as to alternate with the turbine blade rows 34. The rotor 26 is fixedly attached to drive shaft 38 and interconnected to drive shaft 22 via differential bearings 32. The drive shaft 38, in turn, rotatably drives a forward booster rotor 39 which forms part of a booster compressor 40 and which also supports forward fan blade rows 41 that are housed within a nacelle 42 supported about the stationary casing 12 by a plurality of struts 43, only one of which is shown. The booster compressor 40 is comprised of a plurality of booster blade rows 44 fixedly attached to and extending radially outwardly from the booster rotor 39 for rotation therewith and a plurality of booster stator vane rows 46 fixedly attached to and extending radially inwardly from the stationary casing 12. Both the booster blade rows 44 and the stator vane rows 46 are axially spaced and so arranged to alternate with one another.

Clearance Control Apparatus of the Prior Art

Figure 2:
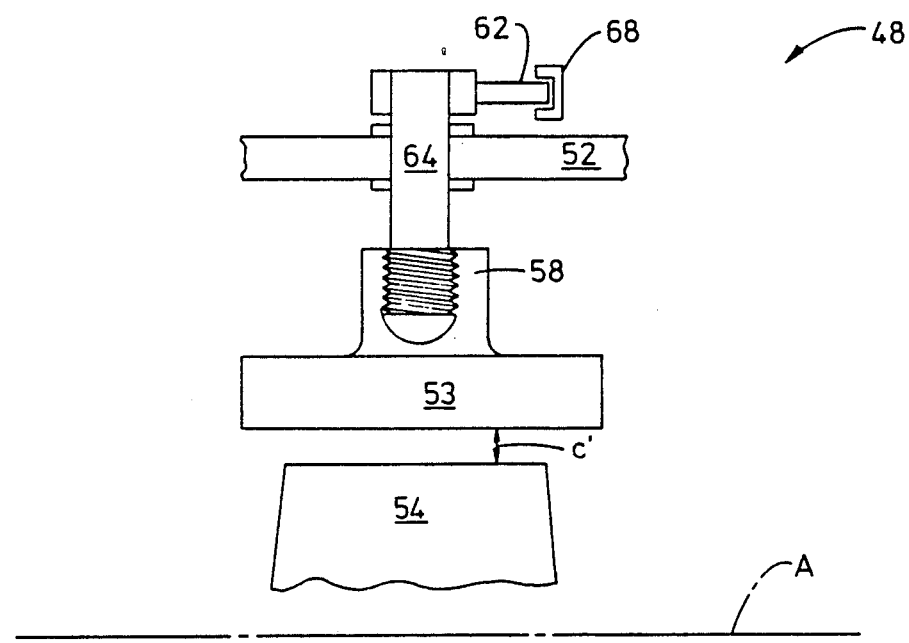
FIG. 2 is a longitudinal axial sectional view of one prior art mechanical apparatus for controlling rotor blade tip and stator casing shroud clearance.
Figure 3:
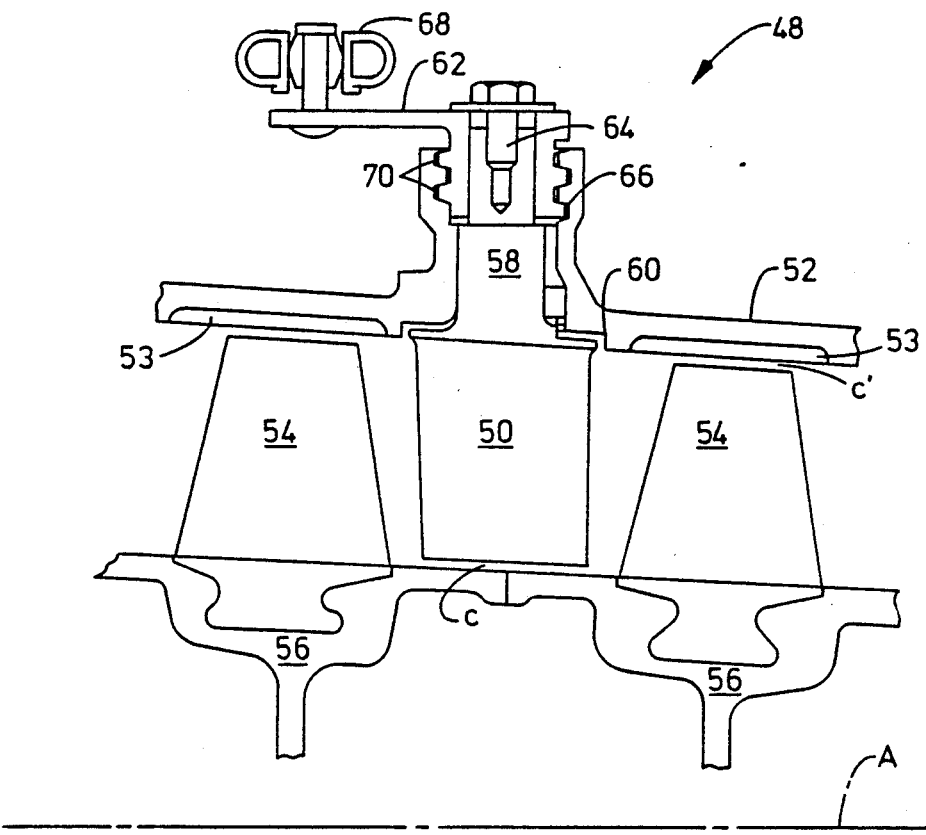
FIG. 3 is a longitudinal axial sectional view of another prior art mechanical apparatus for controlling rotor and stator vane tip clearance.
Figure 4:
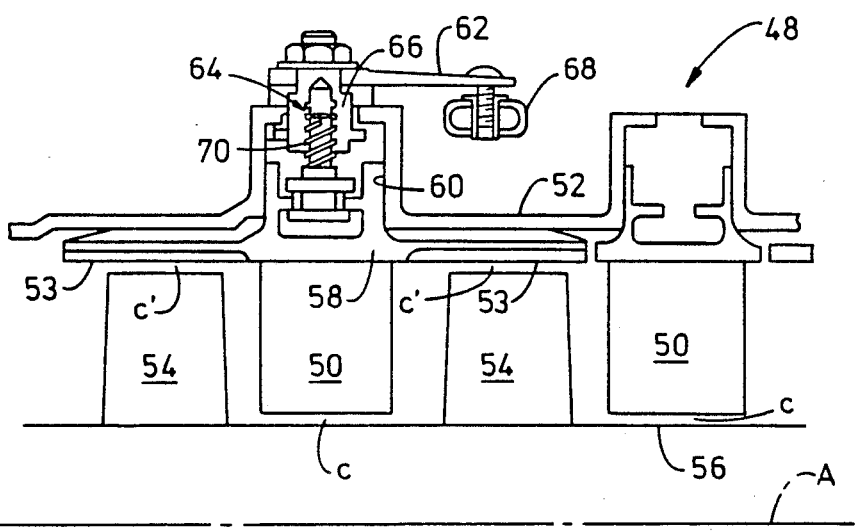
FIG. 4 is a longitudinal axial sectional view of yet another prior art mechanical apparatus for controlling rotor blade tip and stator casing shroud clearance and rotor and stator vane tip clearance.

Referring now to FIGS. 2, 3 and 4, there is illustrated three variations of a prior art clearance control apparatus, generally designated 48 (disclosed on pages 8 and 15 of a publication entitled "Thermal Response Turbine Shroud Study" by E. J. Kawecki, dated July 1979, Technical Report AFAPL-TR-79-2087). The clearance control apparatus 48 is operable for changing the tip clearance gap C between the stator vanes 50, coupled on a stationary casing 52, and a rotatable rotor 56; and/or, the tip clearance gap C' between the rotatable rotor blades 54 and the casing shroud 53 of a gas turbine engine, such as the engine 10 just described.

In the FIG. 2 embodiment, the shroud segment 53 is separate from the casing 52 and is mounted on the end of screw 64 for radial movement relative to the casing 52 toward and away from the tip of the rotor blade 54 for adjustment of the clearance gap C' therebetween. In the FIGS. 3 and 4 embodiments, the stator vanes 50 are mounted on shanks 58 which, in turn, are disposed in openings 60 in the casing 52 for radial movement toward and away from the rotor 56. Each shank is coupled to a lever arm 62 by a screw 64 threaded into a fitting 66 attached to the casing 52. Also, a unison ring 68 upon circumferential movement rotates the screw 64 via the lever arm 62 in order to adjust the clearance gap. To reduce the effects of thermal expansion on the clearance control apparatus 48, each screw 64 has threads 70 of a square cross section. In each of these embodiments, the shroud segment 53 is attached to the stationary casing 52 with the shroud segment 53 being fixedly attached in the FIG. 3 embodiment and movably attached in the FIG. 4 embodiment.

It should be noted that in the FIG. 3 embodiment, the clearance control apparatus 48 operates to adjust the clearance gap C between the tip of the stator vane 50 and the rotor 56, but does not adjust the clearance gap C' between the tip of the rotor blade 54 and the shroud segment 53. However, in the FIG. 4 embodiment, operation of the clearance control apparatus 48 not only adjusts the clearance gap C between the tip of the stator vane 50 and the rotor 56, but also, simultaneously therewith, adjusts the clearance gap C' between the tip of the rotor blade 54 and the shroud segment 53.

Clearance Control Apparatus of Present Invention

Turning now to FIGS. 5-9, there is illustrated a mechanical clearance control apparatus, generally designated 72, in accordance with the present invention. This apparatus 72 can advantageously be used with all compressor and turbine rotors of a gas turbine engine, such as the engine 10 illustrated in FIG. 1, where the rotors have smooth shrouded outer flowpaths and where rotor blade tip to shroud operating minimum clearances are required over the operating range of the engine. Also, the clearance control apparatus 72 is applicable to either aircraft or land based gas turbine engines.

The clearance control apparatus 72 is operable for controlling the clearance between a stationary casing 74 and outer tips 76A of a plurality of blades 76 (shown in FIGS. 5 and 6) of a rotor (not shown) which extend radially outwardly in alternating fashion between stator vanes 78 (shown in FIG. 5) which, in turn, are stationarily attached to and extending radially inwardly from the casing 74. More particularly, a plurality of the clearance control apparatuses 72 (only one being shown in FIGS. 5 and 6) are ganged to a circumferentially extending actuation or unison ring 80 (FIGS. 6 and 8) to operate the moving parts of the apparatuses 72 together to control the clearance the entire 360 degrees around the rotor blade tips 76A and the stationary casing 74.

Figure 6:
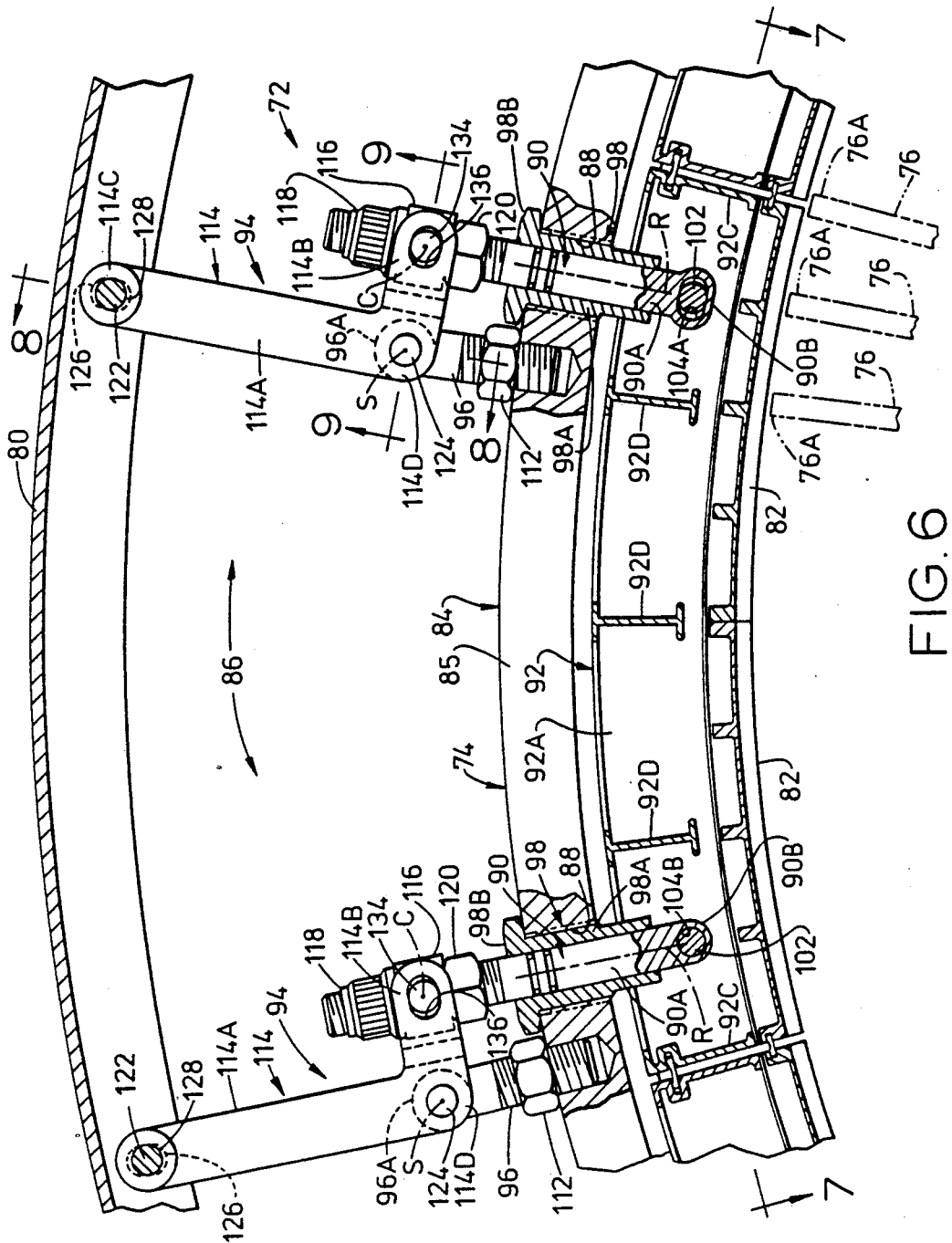
FIG. 6 is a tranverse sectional view, partially shown in elevation, of the apparatus as taken along line 6—6 of FIG. 5.

Each clearance control apparatus 72 includes at least one, and preferably two or more, shroud segments 82 (as seen in FIG. 6), each having an elongated arcuate-shaped body. The shroud segments 82 define successive circumferential portions of a casing shroud and are separate from and spaced radially inwardly of the casing 74. In addition to the shroud segments 82, each clearance control apparatus 72 includes a successive circumferential portion of a mounting structure 84 in the form of a circumferential flange 85 on the casing 74, and a bellcrank-actuated shroud segment positioning mechanism 86. The mounting flange 85 is integral with the casing 74 and has respective circumferentially-spaced passages 88 defined and extending therethrough between the outer, or exterior, side and the inner, or interior, side of the casing 74. The mounting flange 85 projects outwardly from the exterior side of the casing 74 and is spaced radially outwardly from the shroud segments 82.

Figure 5:
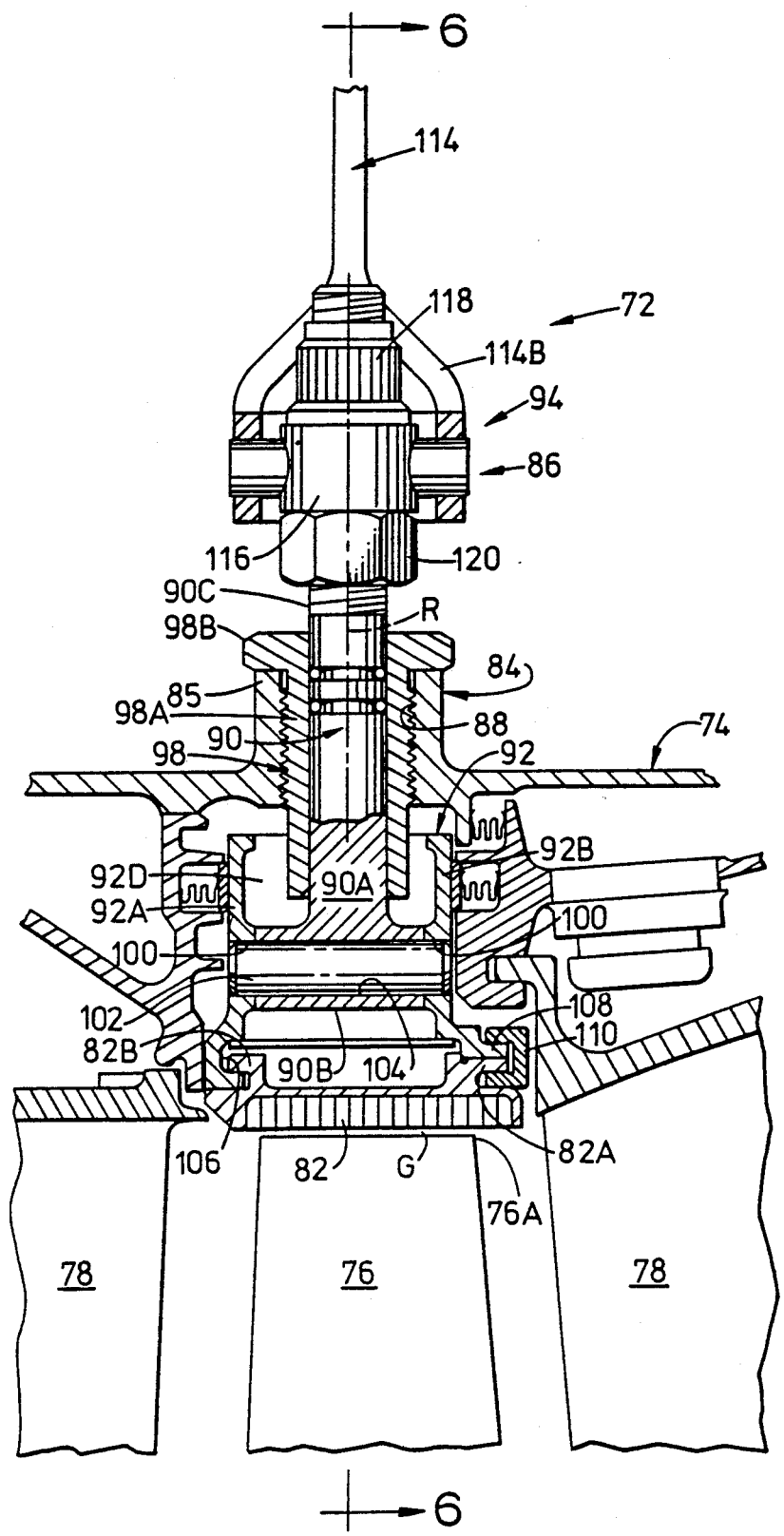
FIG. 5 is a longitudinal axial sectional view of a blade tip clearance control apparatus in accordance with the present invention.

Referring to FIGS. 5 and 6, the positioning mechanism 86 of each apparatus 72 is supported by the stationary casing flange 85 at the locations of the passages 88 and is coupled to the shroud segments 82 and to the unison ring 80. Rotation of the unison ring 80 causes movement of the components of the positioning mechanisms 84, to be described hereinafter, which, in turn, moves the shroud segments 82 toward and away from the rotor blade tips 76A to reach a selected position relative thereto at which a desired clearance, or gap, G (FIG. 5) is established between the shroud segments 82 and rotor blade tips 76A.

More particularly, the positioning mechanism 86 includes a pair of circumferentially-spaced support members 90, a shroud hanger or holder 92, a pair of actuating assemblies 94, and a pair of support structures 96. Each support member 90 of the positioning mechanism 86 is mounted to the mounting flange 85 through one of its circumferentially-spaced passages 88 for radial sliding movement relative thereto toward and away from the central axis A of the engine and the rotor thereof. Each support member 90 includes a longitudinal shaft 90A extending through the passage 88 and a transverse end 90B rigidly fixed to the inner end of the shaft. The shaft 90A of the support member 90 is in the form of an elongated solid bar of generally cylindrical cross-sectional shape and has a longitudinal axis R which extends in the radial direction. The inner end 90B is hollow and of generally cylindrical cross-sectional shape.

The mounting structure 84 also includes one cylindrical bushing member 98 stationarily mounted through each passage 88 of the mounting flange 85. Each bushing member 98 is cylindrical and hollow in cross-sectional shape and mounts the cylindrical shaft 90A for radial sliding movement along the longitudinal axis R thereof relative to the casing 74. More particularly, the bushing member 98 has a tubular body 98A defining an interior cylindrical bearing surface slidably engaged by the support shaft 90A and an annular rim 98B attached to an outer end of the tubular body 98A. The bushing member 98 at its rim 98B is seated on the mounting flange 85.

Referring to FIGS. 5-7, the shroud holder 92 of the positioning mechanism 84 is located at the interior side of the casing 74 adjacent the shroud segments 82. The shroud holder 92 has an elongated arcuate shape and is composed of interconnected front, rear and opposite end walls 92A, 92B, 92C and spaced cross braces 92D which extends between and rigidly interconnect the front and rear walls 92A, 92B. The front and rear shroud holder walls 92A, 92B adjacent their opposite end walls 92C receive the inner ends 90B of the support member shafts 90A and are pivotally mounted thereto by pivot pins 102 which extend through transverse bores 104 defined in the shaft inner ends 90B and through respective pairs of holes 100 defined in the opposite end portions of the front and rear walls 92A, 92B. It should be noted in FIG. 6 that the right bore 104A has an oval or oblong cross-sectional configuration, whereas the left bore 104B has a substantially circular cross-sectional configuration. The oblong configuration of the right bore 104A permits relative movement between the right pivot pin 102 seen in FIG. 6 and the shaft inner end 90B to accommodate changing of the distance between the pins 102 due to radial movement of the shafts 90A and therewith the shroud holder 92 away from and toward the rotor axis A and due to differential thermal expansion which occurs between the components.

Also, as best seen in FIG. 5, along the inner edges of its respective front and rear walls 92A, 92B, the shroud holder 92 has a groove 106 and a flange 108 which are axially-spaced from one another and both extend circumferentially about the rotor axis A. The shroud holder flange 108 and an edge 82A on the shroud segments 82 are held in clamped engagement with one another by a C-shaped locking member 110 slidably mounted over the shroud segment edge 82A and the shroud holder flange 108. The shroud holder groove 106 slidably receives the opposite shroud segment edge 82B. In such manner, the shroud segments 82 are slidably received and removably held by the shroud holder 92 in spaced apart end-to-end tandem fashion, as best seen in FIG. 6. The narrow space between the shroud segments 82 at their adjacent ends and the oblong cross-sectional configuration of the bore 104A in the right one of the shaft inner ends 90B, shown in FIG. 6, accommodates the change in the circumference of the shroud formed by the shroud segments 82 as they are moved radially toward and away from the rotor blade tips 76A.

Referring to FIGS. 5, 6, 8 and 9, each of the bellcrank actuating assemblies 94 is coupled to an outer end 90C of one of the shafts 90A of the support members 90. Further, each bellcrank actuating assembly 94 is mounted to the casing 74 at its exterior side and adjacent one of the support members 90 for pivotal movement about an axis S spaced from and extending transverse to the longitudinal axis R of the support member shaft 90A. Preferably, the pivotal axis S extends generally parallel to the longitudinal axis A of the rotor. Pivotal movement of each bellcrank actuating assembly 94 about the pivotal axis S produces radial movement of the support member shaft 90 and shroud segment 82 therewith toward and away from the rotor blade tips 76A.

More particularly, one of the support structures 96 in the form of a support stud threadably attached to the stationary casing 74 mounts the actuating assembly 94 adjacent to the mounting flange 85 for pivotal movement about the transverse axis S. The support stud 96 threadably mounts an adjustment nut 112. The nut 112 is tightened down against the casing 74 once the stud 96 has been rotatably adjusted to the desired orientation for aligning the actuating assembly 94 with the unison ring 80 and for locking the assembly 94 in the aligned condition.

As seen in FIGS. 5, 6, 8 and 9, each actuating assembly 94 includes an actuating lever in the form of a L-shaped bellcrank 114, a coupler in the form of a cradle joint 116, and adjusting means in the form of outer and inner locking nuts 118, 120. The bellcrank 114 is composed of a long outer leg portion 114A and a short inner leg portion 114B which are rigidly connected together at an elbow 114D and extend in transverse relation to one another. The outer and inner portions 114A, 114B together form a Y-shaped yoke-like structure. The bellcrank 114 is pivotally mounted by outer and inner pivot pins 122, 124 at its outer end 114C and the elbow 114D respectively to the unison ring 80 and to the outer end of the support stud 96. Specifically, the pivot pin 122 extends through radially elongated slots 126 formed in the unison ring 80 and a hole 128 formed through the outer end 114C of the bellcrank 114. The pivot pin 124 extends through a bore 130 formed in a transverse head 96A on the outer end of the support stud 96. The radially elongated slots 126 in the unison ring 80 which receive the outer pins 122 accommodate differential thermal expansion between the casing 74 and the ring 80.

The cradle joint 116 of each actuating assembly 94 includes a central hub 132 and a pair of stub shafts 134 fixed thereto and extending in opposite directions therefrom along a common axis C. The hub 132 is slidably mounted over the outer end 90C of the support member shaft 90A. The outer and inner locking nuts 118, 120 are threadably applied on the shaft outer end 90C on opposite sides of the hub 132 of the cradle joint 116. The nuts 118, 120 can be adjusted along the shaft outer end 90C to tightened them at desired axial positions therealong against the hub 132 in order to cause axial movement of the shaft 90 and thereby initially establish a uniform clearance gap G between the turbine blade tips 76A and the shroud segments 82 about the 360 degree circumference of the casing 74.

The hub 132 of the cradle joint 116 is disposed within the yoke-like configuration of the inner leg portion 114B of the bellcrank 114. The stub shafts 134 of the cradle joint 116 extend through respective elongated slots 136 formed in the inner leg portion 114B. The slots 136 permit relative movement between the stub shafts 134 and the bellcrank inner leg portion 114B for concurrently permitting linear motion of the support member shaft 90 and pivotal motion of the bellcrank 114 upon circumferential movement of the unison ring 80 to operate the actuating assembly 94.

In summary, the positioning mechanisms 86 of the apparatuses 72 are ganged to the unison ring 80 and operable for radially moving the shroud segments 82 toward and away from the rotor blade tips 76A to reach a selected position relative to the rotor (not shown) at which the desired clearance (gap G in FIG. 5) is established between the shroud segments 82 and the rotor blade tips 76A. Further, the mechanisms 86 hold the shroud segments 82 at the selected positions to maintain the desired clearance between the shroud segments and the rotor blade tips upon termination of rotation of the unison ring 80.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. In a gas turbine engine including a rotatable rotor having a central axis and a row of blades with outer tips and a stationary casing with a shroud disposed in concentric relation with said rotor, an apparatus for controlling the clearance between said rotor blade tips and casing shroud, said apparatus comprising:
   (a) a shroud segment defining a circumferential portion of said casing shroud and being separate from and spaced radially inwardly of said casing;
   (b) at least one mounting structure on said stationary casing defining a passage extending between exterior and interior sides of said casing, said mounting structure being spaced radially outwardly from said shroud segment; and
   (c) a shroud segment positioning mechanism supported by said casing, coupled to said shroud segment, and being actuatable for radially moving said shroud segment toward and away from said rotor blade tips to reach a position relative thereto at which a desired clearance is established between said shroud segment and rotor blade tips;
   (d) said positioning mechanism including
      (i) a support member including an elongated shaft mounted through said passage defined by said mounting structure for radial movement relative to said casing and toward and away from said rotor axis, said elongated shaft of said support member having a longitudinal axis and opposite inner and outer ends, said shroud segment being coupled to said inner end of said shaft of said support member at said interior side of said casing and movable radially with radial movement of said shaft,
      (ii) an actuating assembly coupled to said outer end of said elongated shaft of said support member and located at said exterior side of said casing, and (iii) a support structure on said stationary casing mounting said actuating assembly adjacent to said mounting structure for pivotal movement about an axis spaced from and extending transverse to said longitudinal axis of said elongated shaft of said support member such that pivotal movement of said actuating assembly about said transverse axis produces radial movement of said elongated shaft of said support member and said shroud segment therewith relative to said casing and along said longitudinal axis toward and away from said rotor blade tips.

2. The apparatus as recited in claim 1, wherein said positioning mechanism also includes a shroud holder connected to said inner end of said elongated shaft and having axially-spaced elements for slidably receiving and holding said shroud segment at spaced longitudinal edge portions thereof.

3. The apparatus as recited in claim 1, wherein said mounting structure is an annular flange projecting from said exterior side of said casing, said passage being defined radially through said flange between said exterior and interior sides of said casing and receiving said shaft therethrough.

4. The apparatus as recited in claim 1, wherein said mounting structure includes a bushing member stationarily mounted through said passage and mounting said shaft for radial sliding movement along said longitudinal axis relative to said casing.

5. The apparatus as recited in claim 4, wherein said bushing member has a tubular body defining an interior bearing surface slidably engaged by said shaft and an annular rim attached to an outer end of said tubular body, said bushing being seated on said flange at said rim.

6. The apparatus as recited in claim 1, wherein said actuating assembly includes an actuating lever having outer leg portion and an inner leg portion connected and extending in transverse relation to said outer leg portion.

7. The apparatus as recited in claim 6, wherein said actuating assembly also includes a coupler mounted on said outer end of said elongated shaft and pivotally connected to said inner leg portion of said actuating lever.

8. The apparatus as recited in claim 7, wherein said actuating assembly further includes means for adjusting the position of said coupler along said elongated shaft for initially establishing the axial position of said elongated shaft and thereby the space between said shroud segment and said blade tips.

9. The apparatus as recited in claim 8, wherein said coupler includes:
a central hub mounted to said outer end of said support member; and
a pair of stub shafts connected to and extending in opposite directions from said hub along a common axis and pivotally connected to said inner leg portion of said actuating lever.

10. The apparatus as recited in claim 9, wherein said inner leg portion of said actuating lever has a pair of elongated slots which receive said respective stub shafts of said coupler so as to permit relative movement between said stub shafts of said coupler and said inner leg portion of said actuating lever for concurrently accommodating substantially linear motion of said elongated shaft and pivotal motion of said actuating lever.

11. The apparatus as recited in claim 6, wherein:
said support structure is a stub shaft pivotally connected to said actuating lever at an elbow defined by the intersection of said outer and inner leg portions.

12. In a gas turbine engine including a rotatable rotor having a central axis and a row of blades with outer tips and a stationary casing with a shroud disposed in concentric relation with said rotor, an apparatus for controlling the clearance between said rotor blade tips and casing shroud, said apparatus comprising:

(a) a shroud segment defining a circumferential portion of said casing shroud and being separate from and spaced radially inwardly of said casing;

(b) a mounting structure on said stationary casing defining a plurality of circumferentially-spaced passages extending between exterior and interior sides of said casing, said mounting structure being spaced radially outwardly from said shroud segment; and (c) a shroud segment positioning mechanism supported by said casing, coupled to said shroud segment, and being actuatable for radially moving said shroud segment toward and away from said rotor blade tips to reach a position relative thereto at which a desired clearance is established between said shroud segment and rotor blade tips;

(d) said positioning mechanism including
(i) a pair of circumferentially-spaced support members including elongated shafts each being mounted through a respective one of said passages defined by said mounting structure for radial movement relative to said casing and toward and away from said rotor axis, said elongated shafts of said support members each having a longitudinal axis and opposite inner and outer ends, (ii) a shroud holder extending between and pivotally connected at its opposite end portions to said inner ends of said elongated shafts of said support members, said shroud holder removably holding said shroud segment at said interior side of said casing, (iii) a pair of circumferentially-spaced actuating assemblies each coupled to an outer end of one of said elongated shafts of said support members and located at said exterior side of said casing, and (iv) a pair of support structures on said stationary casing each mounting one of said actuating assemblies adjacent to said mounting structure for pivotal movement about an axis spaced from and extending transverse to said longitudinal axis of said elongated shaft of said support member such that pivotal movement of each of said actuating assemblies about said transverse axis produces radial movement of said elongated shaft of said support member and said shroud segment therewith relative to said casing and along said longitudinal axis toward and away from said rotor blade tips.

13. The apparatus as recited in claim 12, wherein said positioning mechanism also includes a pair of elongated pins each pivotally connecting one of said opposite end portions of said shroud holder to a respective one of said support members.

14. The apparatus as recited in claim 13, wherein said each actuating assembly includes an actuating lever having outer leg portion and an inner leg portion connected and extending in transverse relation to said outer leg portion.

15. The apparatus as recited in claim 14, wherein said each actuating assembly also includes a coupler mounted on said outer end of one of said elongated shaft and pivotally connected to said inner leg portion of said actuating lever.

16. The apparatus as recited in claim 15, wherein said coupler includes:
 a central hub mounted to said outer end of said one elongated shaft; and
 a pair of stub shafts connected to and extending in opposite directions from said hub along a common axis and pivotally connected to said inner leg portion of said actuating lever.

17. The apparatus as recited in claim 16, wherein said inner leg portion of said actuating lever has a pair of elongated slots which receive said respective stub shafts of said coupler so as to permit relative movement between said stub shafts of said coupler and said inner leg portion of said actuating lever for concurrently accommodating substantially linear motion of said elongated shaft and pivotal motion of said actuating lever.

18. The apparatus as recited in claim 15, wherein said each actuating assembly further includes means for adjusting the position of said coupler along said one elongated shaft for initially establishing the axial position of said elongated shaft and thereby the space between said shroud segment and said blade tips.

19. The apparatus as recited in claim 14, wherein:
 said support structure is a stub shaft pivotally connected to said actuating lever at an elbow defined by the intersection of said outer and inner leg portions.

20. The apparatus as recited in claim 12, wherein said shroud holder has axially-spaced elements for slidably receiving and holding said shroud segment at spaced longitudinal edge portions thereof.

21. The apparatus as recited in claim 12, wherein said mounting structure is an annular flange projecting from said exterior side of said casing, said passages being defined radially through said flange between said exterior and interior sides of said casing and receiving said shaft therethrough.

22. The apparatus as recited in claim 12, wherein said mounting structure includes a plurality of bushing members stationarily mounted through said respective passages and mounting said shafts for radial sliding movement along said longitudinal axis relative to said casing.

* * * * *